US012590711B2

(12) United States Patent
Thurlkill et al.

(10) Patent No.: US 12,590,711 B2
(45) Date of Patent: Mar. 31, 2026

(54) SYSTEMS AND METHODS FOR MONITORING MAKEUP WATER FOR AUTOMATED LEAK DETECTION

(71) Applicant: Rheem Manufacturing Company, Atlanta, GA (US)

(72) Inventors: Stephen Thomas Thurlkill, Newbury Park, CA (US); David Richard Baldwin, Ventura, CA (US); Jorge Miguel Gamboa Revilla, Oxnard, CA (US)

(73) Assignee: Rheem Manufacturing Company, Atlanta, GA (US)

( * ) Notice: Subject to any disclaimer, the term of this patent is extended or adjusted under 35 U.S.C. 154(b) by 98 days.

(21) Appl. No.: 18/404,471

(22) Filed: Jan. 4, 2024

(65) Prior Publication Data

US 2024/0247814 A1    Jul. 25, 2024

Related U.S. Application Data

(60) Provisional application No. 63/440,004, filed on Jan. 19, 2023.

(51) Int. Cl.
| | |
|---|---|
| *F24D 19/10* | (2006.01) |
| *F24H 15/12* | (2022.01) |
| *F24H 15/238* | (2022.01) |
| *F24H 15/242* | (2022.01) |
| *F24H 15/395* | (2022.01) |

(Continued)

(52) U.S. Cl.
CPC ......... *F24D 19/1033* (2013.01); *F24H 15/12* (2022.01); *F24H 15/238* (2022.01); *F24H 15/242* (2022.01); *F24H 15/395* (2022.01); *F24H 15/45* (2022.01); *G01M 3/2807* (2013.01); *F24D 2240/10* (2013.01)

(58) Field of Classification Search
CPC .. F24D 19/1033; F24D 2240/10; F24H 15/12; F24H 15/238; F24H 15/242; F24H 15/395; F24H 15/45; G01M 3/2807
USPC ............................................................. 137/4
See application file for complete search history.

(56) References Cited

U.S. PATENT DOCUMENTS

| | | | | |
|---|---|---|---|---|
| 4,944,253 A | * | 7/1990 | Bellofatto | .............. F24H 9/2007 122/504 |
| 5,014,770 A | * | 5/1991 | Palmer | .................. F24F 5/0046 165/48.2 |

(Continued)

*Primary Examiner* — William M Mccalister
(74) *Attorney, Agent, or Firm* — Eversheds Sutherland (US) LLP

(57) ABSTRACT

The present disclosure is directed to systems and methods for automatically detecting a leak of a closed loop hydronic boiler system having a makeup water inlet line. The system may include a fluid flow sensor configured to sense fluid flow through the makeup water inlet line, and optionally a pressure sensor and/or a water chemistry sensor. In addition, the system may include a processor configured to detect positive movement of makeup water through the makeup water inlet line indicative of a leak of the hydronic boiler system based on the measured fluid flow, and cause a display to display information indicative of the leak upon detection of positive movement of makeup water through the makeup water inlet line. In some embodiments, the processor further may automatically adjust operations of the hydronic boiler system responsive to detection of the leak.

19 Claims, 4 Drawing Sheets

(51) Int. Cl.
  *F24H 15/45*       (2022.01)
  *G01M 3/28*       (2006.01)

(56)             References Cited

U.S. PATENT DOCUMENTS

| | | | |
|---|---|---|---|
| 2014/0216437 A1* | 8/2014 | Martian | F24H 1/08 |
| | | | 237/63 |
| 2021/0231516 A1* | 7/2021 | Sterling | G01M 3/007 |

\* cited by examiner

SYSTEMS AND METHODS FOR MONITORING MAKEUP WATER FOR AUTOMATED LEAK DETECTION

CROSS-REFERENCE TO RELATED APPLICATION

This application claims the benefit of U.S. Application No. 63/440,004, filed Jan. 19, 2023, the entirety of which is hereby incorporated by reference.

TECHNICAL FIELD

The present disclosure is generally in the field of leak detection systems, particularly by monitoring makeup water flow within a closed loop hydronic boiler system.

BACKGROUND

Commercial and industrial water heating systems require large investments in infrastructure. Leaks in a closed loop water system can lead to the loss of both boiler performance and system performance, as well as the loss of chemicals in the water. Such leaks are typically not identified until it is too late and damage to the system has already been done, which may be very costly to fix. For example, closed loop water systems operating under very high temperatures that experience a leak have an increased risk of developing scale, which may lead to pressure imbalance within the water heater tank that may shut off the system or lead to overflow, requiring expensive repair or potential early replacement of the heating appliance.

The foregoing background information is provided to reveal information believed by the applicant to be of possible relevance to the present disclosure. No admission is necessarily intended, nor should be construed, that any of the preceding information constitutes prior art against the present disclosure.

DETAILED DESCRIPTION

Figure 1:
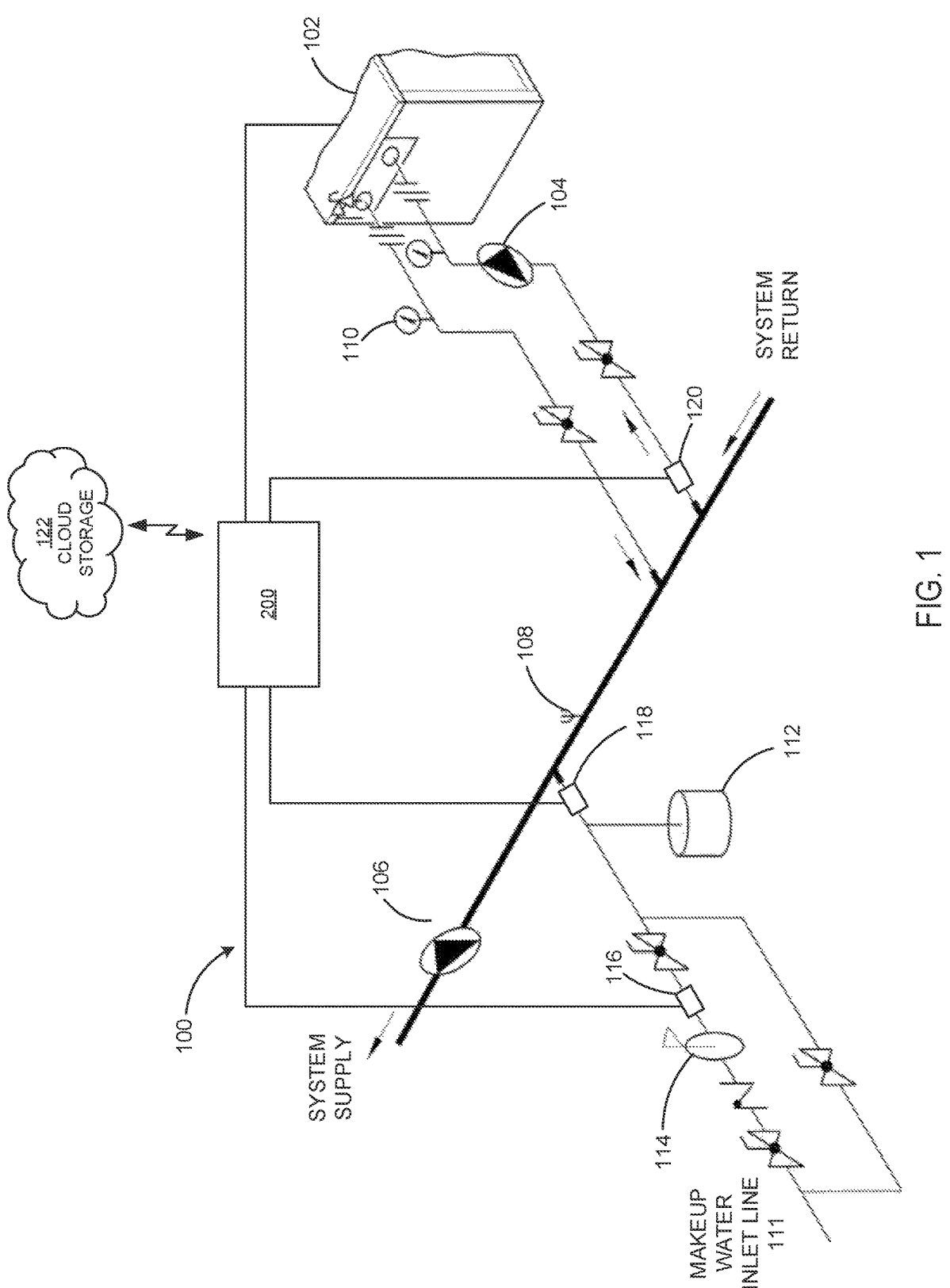
FIG. 1 illustrates a system for monitoring makeup water in a closed loop hydronic boiler system for detecting a leak constructed in accordance with the principles of the present disclosure.

The present disclosure is directed to automated leak detection systems and methods for use with a closed loop hydronic boiler system having a makeup water inlet line. For example, the system may include a sensor configured to obtain sensing data associated with fluid flow into the closed loop hydronic boiler system, at least one processor, and memory having instructions that, when executed by the at least one processor, cause the at least one processor to: determine that water is leaking from the closed loop hydronic boiler system, and cause a display to display information indicative of the leak. Some embodiments may include implementations with heat pump water heaters.

The sensor may be a fluid flow sensor, e.g., a Reed switch, and/or a fluid flow meter fluidically coupled to the makeup water inlet line and configured to obtain sensing data indicative of fluid flow through the makeup water inlet line. Accordingly, the at least one processor may be configured to: determine movement of makeup water through the makeup water inlet line based on the sensed fluid flow, and determine that water is leaking from the closed loop hydronic boiler system based on the determined movement of makeup water through the makeup water inlet line. Additionally or alternatively, the system may include a pressure sensor operatively coupled to the hydronic boiler system and configured to obtain sensing data indicative of a pressure differential across the hydronic boiler system. Accordingly, the at least one processor may be configured to determine a pressure drop based on the sensed pressure differential, and determine that water is leaking from the closed loop hydronic boiler system based on the determined pressure drop and optionally the determined movement of makeup water through the makeup water inlet line.

The at least one processor may be configured to cause the hydronic boiler system to operate at a lower temperature responsive to the determination that water is leaking from the closed loop hydronic boiler system, e.g., by determining movement of makeup water through the makeup water inlet line and/or determine that the pressure differential exceeds a predetermined threshold, to reduce a likelihood of scale buildup within the hydronic boiler system. In some embodiments, the system may be configured for use with a closed loop hydronic boiler system having two or more hydronic boilers. Accordingly, the at least one processor may be configured to adjust operations of at least one of the two or more hydronic boilers responsive to the determination that water is leaking from the closed loop hydronic boiler system to limit damage to the system.

Moreover, the at least one processor may be configured to record the determination of movement of makeup water through the makeup water inlet line over time. In addition, the at least one processor may be configured to transmit information indicative of the determination of movement of makeup water through the makeup water inlet line to a cloud storage. The at least one processor further may be configured to generate an alert based on the determination of movement of makeup water through the makeup water inlet line. Additionally, the at least one processor may be configured to cause the display to display the alert.

In some embodiments, the sensor may be a pressure sensor coupled to the hydronic boiler system and configured to obtain sensing data indicative of a pressure differential across the hydronic boiler system. Accordingly, the at least one processor may be configured to: determine a pressure drop based on the sensed pressure differential, and determine that water is leaking from the closed loop hydronic boiler system based on the determined pressure drop. For example, the at least one processor may be configured to determine the pressure drop by comparing the sensed pressure differential with a baseline pressure differential under normal operation conditions. Accordingly, the at least one processor may be configured to determine that water is leaking from the closed loop hydronic boiler system by determining when the determined pressure drop exceeds a predetermined threshold.

In addition, the system further may include a sensor in fluid communication with the hydronic boiler system and configured to obtain sensing data indicative of water chemistry of the hydronic boiler system. Accordingly, the at least one processor may be configured to determine that water is leaking from the closed loop hydronic boiler system based on the sensed water chemistry and optionally the determined movement of makeup water through the makeup water inlet line. For example, the at least one processor may be configured to determine that water is leaking from the closed loop hydronic boiler system by determining when a rate of change of the sensed water chemistry exceeds a predetermined threshold. Additionally, the at least one processor may be configured to determine that water is leaking from the closed loop hydronic boiler system by comparing the sensed water chemistry with a baseline water chemistry under normal operation conditions.

In accordance with another aspect of the present disclosure, another automated leak detection system for use with a closed loop hydronic boiler system having a makeup water inlet line is provided. The system may include a fluid flow sensor fluidically coupled to the makeup water inlet line and configured to obtain sensing data indicative of fluid flow through the makeup water inlet line, at least one processor, and memory having instructions that, when executed by the at least one processor, causes the at least one processor to: determine movement of makeup water through the makeup water inlet line based on the sensed fluid flow, and determine that water is leaking from the closed loop hydronic boiler system based on the determined movement of makeup water through the makeup water inlet line. The at least one processor may be configured to cause the hydronic boiler system to operate at a lower temperature responsive to the determination of movement of makeup water through the makeup water inlet line to reduce a likelihood of scale buildup within the hydronic boiler system.

In accordance with another aspect of the present disclosure, a method for automatically detecting a leak of a closed loop hydronic boiler system having a makeup water inlet line is provided. The method may include monitoring data associated with fluid flow of the closed loop hydronic boiler system; determining, by the at least one processor, that water is leaking from the closed loop hydronic boiler system; and displaying information indicative of the leak via a display. The method further may include monitoring data indicative of pressure differential across the hydronic boiler system via a pressure sensor operatively coupled to the hydronic boiler system, and determining, by the at least one processor, a pressure drop based on the measured pressure differential. Accordingly, determining, by the at least one processor, that water is leaking from the closed loop hydronic boiler system may be based on the determined pressure drop.

Monitoring data associated with fluid flow of the closed loop hydronic boiler system may include monitoring data indicative of fluid flow through the makeup water inlet line via a fluid flow sensor fluidically coupled to the makeup water inlet line. Accordingly, the method may include determining, by the at least one processor, movement of makeup water through the makeup water inlet line based on the monitored fluid flow, such that determining, by the at least one processor, that water is leaking from the closed loop hydronic boiler system may be based on the determined movement of makeup water through the makeup water inlet line. Alternatively, monitoring data associated with fluid flow of the closed loop hydronic boiler system may include monitoring data indicative of pressure differential across the hydronic boiler system via a pressure sensor operatively coupled to the hydronic boiler system. Accordingly, determining, by the at least one processor, that water is leaking from the closed loop hydronic boiler system may be based on the monitored pressure differential and optionally the determined movement of makeup water through the makeup water inlet line.

The method further may include monitoring data indicative of water chemistry of the hydronic boiler system via a sensor in fluid communication with the hydronic boiler system. Accordingly, determining, by the at least one processor, that water is leaking from the closed loop hydronic boiler system may be based on the monitored water chemistry and optionally the determined movement of makeup water through the makeup water inlet line. Moreover, the method may include generating, by the at least one processor, an alert based on the determined movement of makeup water through the makeup water inlet line. In addition, the method may include causing, by the at least one processor, the hydronic boiler system to operate at a lower temperature responsive to the determined leak from the closed loop hydronic boiler system to reduce a likelihood of scale buildup within the hydronic boiler system.

Referring now to FIG. 1, system 100 for automated leak detection of a closed loop hydronic boiler system is provided. System 100 is configured to identify a leak or potential leak at an early stage, e.g., the onset of a leak, and to provide easy access to information indicative of the leak or potential leak as well as historical data, e.g., via a central graphical user interface, such that a user may take appropriate maintenance actions early on while avoiding expensive maintenance and replacement costs. As shown in FIG. 1, the closed loop hydronic boiler system may include hydronic boiler 102, e.g., a water boiler having a rear mounted pump, configured to heat water in a closed loop system having, for example, optional pump 104 (if hydronic boiler 102 does not include a rear mounted pump), main system pump 106, water sensor 108, one or more optional temperature gauges 110, expansion tank 112, and water pressure regulator 114.

Hydronic boiler 102 may have a rear mounted pump configured to circulate heated water through the closed loop hydronic boiler system. If hydronic boiler 102 does not have a rear mounted pump, pump 104 may be disposed, for example, on the return side of the closed loop system adjacent to hydronic boiler 102 for circulating water through the closed loop system, e.g., through hydronic boiler 102. Water sensor 108 may be configured to monitor flow through the closed loop system. Main system pump 106 may be disposed, for example, on the flow/supply side of the closed loop system for pressurizing the heated water and efficiently pumping the heated water through the closed loop hydronic boiler system. Temperature gauges 110 may be configured to sense and display the internal temperature of hydronic boiler 102. Water pressure regulator 114 may be a plumbing valve configured to reduce the pressure of the makeup water to a predetermined level before entering the closed loop system via makeup water inlet line 111. Expansion tank 112 may be configured to provide thermal expansion of hot water if a backflow preventer, check valve, water meter, or water pressure regulator 114 is installed in makeup water inlet line 111.

Under normal operating conditions, in the closed loop hydronic boiler system, water is generally circulated within the system without a change in water volume. In addition, the closed loop system may be pressurized to a predetermined pressure level based on the desired fluid flow across the system. Moreover, the circulated water may include a predetermined water chemistry, e.g., determined when water is initially added to the closed loop system. When pressure drops within the closed loop system, e.g., due to a leak, makeup water may be automatically added to the closed loop hydronic boiler system via makeup water inlet line 111 to compensate for the reduction of water causing the pressure drop across the system. For example, a valve, e.g., a ball valve, fluidically coupled to makeup water inlet line 111 may be actuated upon detection of the pressure drop by the closed loop system to permit makeup water to enter the closed loop system.

The addition of makeup water may be undesirable as it may damage components of the closed loop system, e.g., by adding new solids or gases, and may cause corrosion by introducing oxygen to the closed loop system. The addition of solids may result in scale buildup in the closed loop system over time, the likelihood of which is increased when the system is running at high temperatures. The degree of scale buildup may necessitate expensive maintenance or replacement of components of the system altogether. Moreover, adding makeup water to the closed loop system may dilute corrosion inhibitors present in the circulated water, thereby reducing their effectiveness.

Some current closed loop hydronic boiler systems include a water meter that may display information indicative of the water level of the system, e.g., whether makeup water has been added to the closed loop system. Generally, these water meters are manually checked monthly, and thus, a leak that has developed, e.g., in the plumbing or hydronic boiler tank, may not be realized for three to four weeks after the leak has developed, by which time damage may have already occurred to the system.

Thus, to detect a leak or potential leak within the system at the onset of the leak, system 100 may include fluid flow sensor 116 fluidically coupled to makeup water inlet line 111 of the closed loop hydronic boiler system, and configured to obtain sensing data indicative of fluid flow through makeup water inlet line 111. For example, fluid flow sensor 116 may be a mechanical flow switch, e.g., a Reed switch, integrated on makeup water inlet line 111 and configured to detect whether or not there is fluid flow through makeup water inlet line 111. As described above, makeup water is typically not introduced into the closed loop system until a potential leak is detected by the system, e.g., via a pressure drop across the system, and thus, under normal operation conditions, fluid flow through makeup water inlet line 111 will be zero. Accordingly, fluid flow sensor 116 may sense when there is fluid flow through makeup water inlet line 111, which may be indicative of a leak within the closed loop hydronic boiler system. In some embodiments, fluid flow sensor 116 may be a flow sensor configured to measure the amount of fluid flow through makeup water inlet line 111.

Fluid flow sensor 116 may be operatively coupled to controller 200 of system 100, e.g., either wirelessly or via a wired connection, to thereby transmit data indicative of sensed fluid flow through makeup water inlet line 111 to controller 200 for further processing. Controller 200 may execute one or more algorithms stored in its memory to determine whether a leak is present based at least partially on the sensed fluid flow through makeup water inlet line 111, as described in further detail below. Moreover, controller 200 may cause a display, e.g., a graphical user interface, operatively coupled to controller 200 to display information indicative of the detected leak in real-time. For example, controller 200 may display information indicative of positive movement of water through makeup water inlet line 111, such that a user may manually observe the information and take appropriate action to evaluate the hydronic boiler and fix the leak if present.

Controller 200 further may record data indicative of positive movement of water through makeup water inlet line 111 over time, which may be subsequently downloaded for further observation by a user. Additionally or alternatively, controller 200 may transmit data indicative of positive movement of water through makeup water inlet line 111 to a remote cloud, e.g., cloud storage 122, which may be subsequently downloaded for further observation by a user. Accordingly, a third party may with permission to access cloud storage 122 may download the stored and transmits notifications to relevant end-users, either directly or via cloud storage 122 and controller 200. In addition, controller 200 may transmit the data to a building controller operatively coupled to controller 200, such that the building operators may observe and address any relevant issues. Moreover, controller 200 may generate an alert, e.g., an audible and/or visual alert, responsive to detection of positive movement of fluid through makeup water inlet line 111, which may be displayed and/or emitted by the display to alert a user. For example, the alert may cause the display to flash and/or display a warning to the user. Accordingly, the user may be notified of a potential leak at the onset of the leak and take appropriate maintenance actions.

In some embodiments, responsive to detection of a leak within the closed loop hydronic boiler system, controller 200 may take automated steps to troubleshoot and/or mitigate further damage, e.g., development of scale, to address the potential leak. For example, as described above, the addition of makeup water in a closed loop system running under very high temperatures may increase the risk of scale buildup within the system, e.g., by introducing solids into the system. Accordingly, controller 200, which may be operatively coupled to the hydronic boiler controls, may instruct the hydronic boiler to temporarily operate at a lower temperature to reduce the likelihood of scale buildup upon detection of a leak.

Moreover, in a closed loop water heater system having more than one hydronic boiler, controller 200 may adjust operations of at least one of the other hydronic boilers to limit the potential damage due to the detected leak by spreading the calculated load across fewer units while still achieving the required heat output. For example, if the multi-hydronic boiler system includes two hydronic boilers, each providing 40% water heating input for a total of 80% input, upon detection of a leak in the closed loop system, controller 200 may instruct one of the hydronic boilers to cease operations, e.g., provide 0% input, and instruct the other hydronic boiler to temporarily provide 80% of the water heating input to limit the potential for damage to one instead of both hydronic boilers.

As further shown in FIG. 1, system 100 may include pressure sensor 118, e.g., a pressure transducer, operatively coupled to the closed loop hydronic boiler system and to controller 200, and configured to measure a pressure differential across the hydronic boiler system. Pressure sensor 118 may be previously integrated with the closed loop hydronic boiler system, or alternatively, may be separate components operatively coupled to the closed loop system and to controller 200. As described above, the closed loop system may be pressurized to a predetermined pressure level, such that a detected pressure drop may be indicative of a leak of the closed loop system. Accordingly, pressure sensor 118 may transmit data indicative of the measured pressure differential across the hydronic boiler system to controller 200 further processing.

Controller 200 may detect a leak based on both the sensed positive movement of fluid through the makeup water and the measured pressure differential. For example, controller 200 may compare the measured pressure differential with a baseline pressure differential under normal operating conditions, such that controller 200 may determine a leak when the measured pressure differential exceeds a predetermined pressure threshold. Although pressure sensor 118 is shown in FIG. 1 as being fluidically coupled to the outlet line of hydronic boiler 102, as will be understood by a person having ordinary skill in the art, pressure sensor 118 may be disposed in another location within system 100, e.g., within hydronic boiler 102.

In addition, system 100 may include water chemistry sensor 120 in fluid communication with the closed loop hydronic boiler system and operatively coupled to controller 200, and configured to measure the water chemistry of the hydronic boiler system. As described above, the water chemistry of the closed loop system may be predetermined, e.g., when water is initially introduced into the system, such that a detected change in the water chemistry may be indicative of introduction of makeup water to the closed loop system, which may be indicative of a leak of the closed loop system. For example, the addition of makeup water into the closed loop system may dilute the water chemistry of the closed loop system over time. The water chemistry may include, for example, the pH level, the composition of one or more minerals and/or chemicals such as a sodium nitrite blend, e.g., borate, silicate, tolyltriazole, and sodium hydroxide, the amount of corrosion inhibitors, the oxygen level, etc.

Accordingly, water chemistry sensor 120 may transmit data indicative of the measured water chemistry of the hydronic boiler system to controller 200 further processing. Controller 200 may detect a leak based on both the sensed positive movement of fluid through the makeup water as well as the measured water chemistry and/or the measured pressure differential. For example, controller 200 may compare the measured water chemistry with a baseline water chemistry under normal operating conditions, such that controller 200 may determine a leak when the measured water chemistry exceeds a predetermined threshold. Moreover, controller 200 may determine the rate of change of water chemistry over time, and determine a leak when the rate of change of water chemistry exceeds a predetermined threshold. Although water chemistry sensor 120 is shown in FIG. 1 as being fluidically coupled to the inlet line of hydronic boiler 102, as will be understood by a person having ordinary skill in the art, water chemistry sensor 120 may be disposed in another location within system 100, e.g., the outlet line of hydronic boiler 102. Preferably, water chemistry sensor 120 is disposed at a location within system 100 having the lowest temperature point to thereby preserve the life of the sensor.

Figure 2:
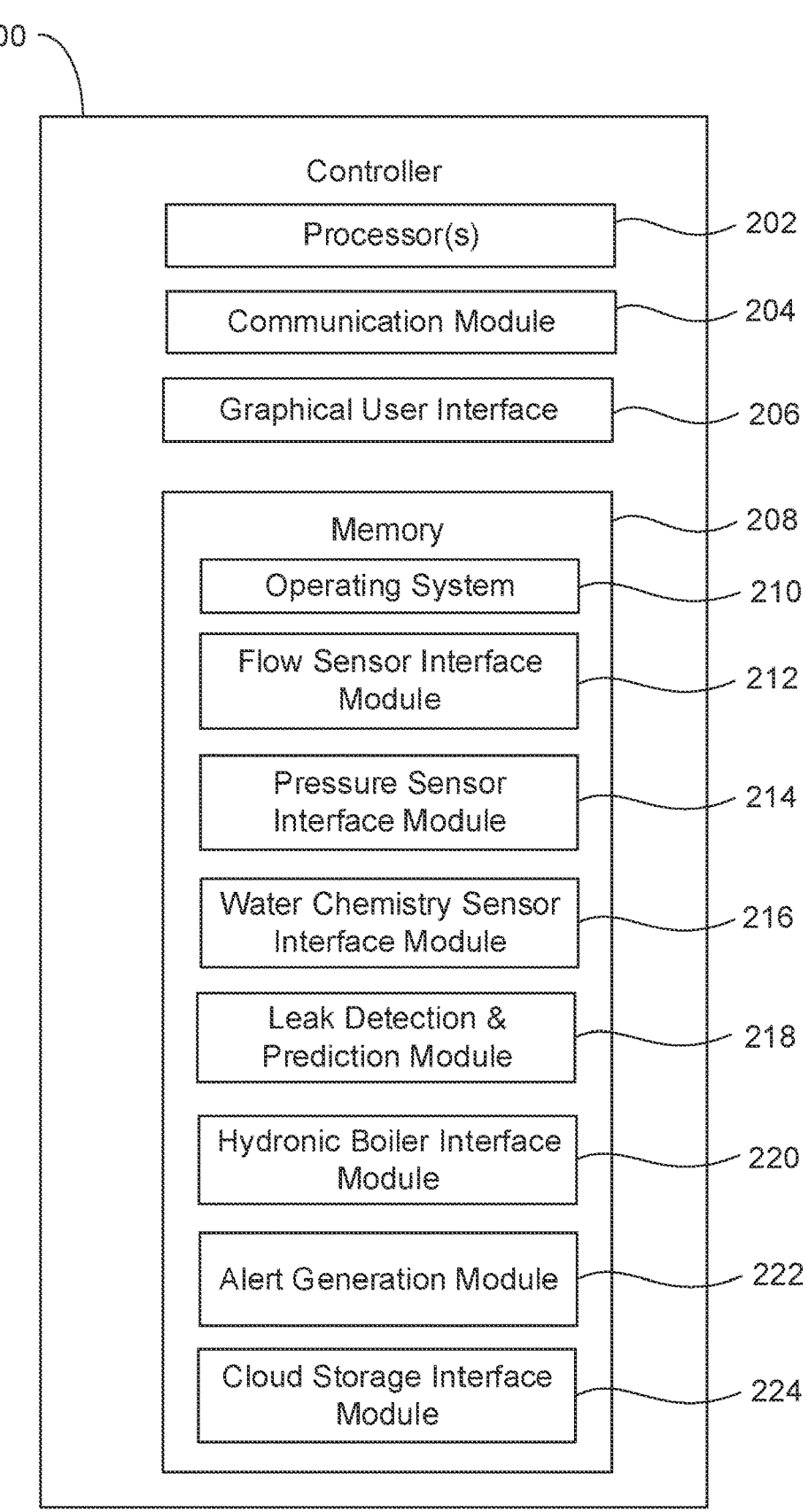
FIG. 2 illustrates some example components that may be included in the controller of the system of FIG. 1 in accordance with the principles of the present disclosure.
Figure 4:
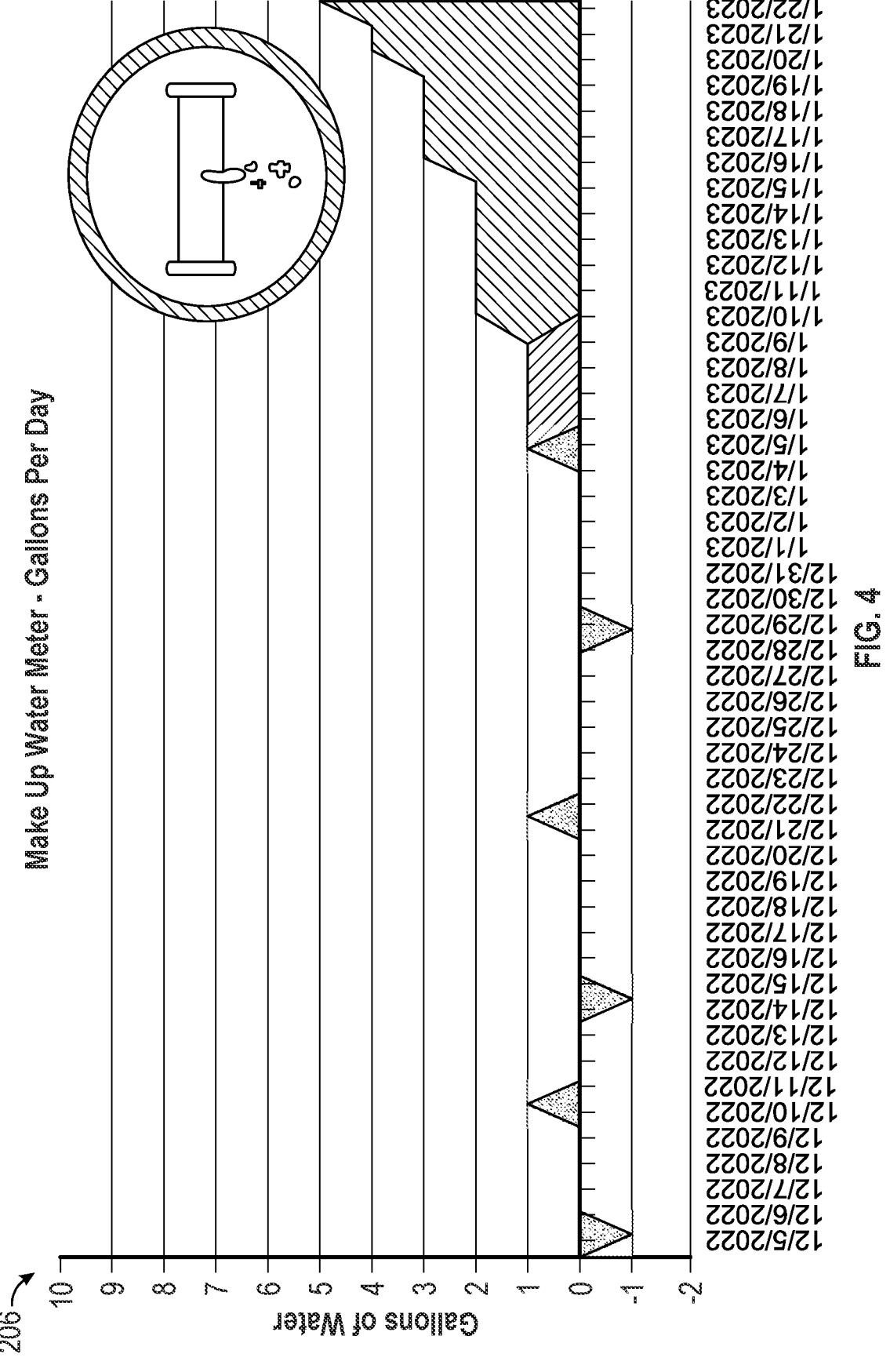
FIG. 4 illustrates an example graphical user interface in accordance with the principles of the present disclosure.

Referring now to FIG. 2, components that may be included in controller 200 are described in further detail. Controller 200 may include one or more processors 202, communication module 204, graphical user interface (GUI) 206, and memory 208. Communication module 204 allows controller 200 to communicate with hydronic boiler 102, fluid flow sensor 116, pressure sensor 118, water chemistry sensor 120, and cloud storage 122 via a wired connection and/or a wireless connection, e.g., Wi-Fi, Bluetooth, machine-to-machine communication, etc. Communication module 204 may use any of various communication formats, such as, for example, an Internet communications format, or a cellular communications format. As described above, GUI 206 may include a display for displaying information, e.g., via graphical representations, indicative of a detected leak, positive movement of fluid through makeup water inlet line 111 (as shown in FIG. 4), pressure levels, and/or water chemistry. GUI 206 further may receive user input, e.g., to troubleshoot, reset, shut off or on, and/or override, the controls of system 100.

Memory 208, which is one example of a non-transitory computer-readable medium, may be used to store operating system (OS) 210, flow sensor interface module 212, pressure sensor interface module 214, water chemistry sensor interface module 216, leak detection and prediction module 218, hydronic boiler interface module 220, alert generation module 222, and cloud storage interface module 224. The modules are provided in the form of computer-executable instructions that may be executed by processor 202 for performing various operations in accordance with the disclosure. Memory 208 may include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). In the context of this document, a "non-transitory computer-readable medium" may be, for example but not limited to, an electronic, magnetic, optical, electromagnetic, infrared, or semiconductor system, apparatus, or device.

Flow sensor interface module 212 may be executed by processor 202 for receiving and processing data measured by fluid flow sensor 116. For example, from the data received from fluid flow sensor 116, flow sensor interface module 212 may determine whether or not there is fluid flow through makeup water inlet line 111 of system 100, e.g., whether makeup water is being added to the closed loop hydronic boiler system, indicative of a leak. In some embodiments, when fluid flow sensor 116 is configured to measure an amount of fluid flow through makeup water inlet line 111, flow sensor interface module 212 may receive and process data measured by fluid flow sensor 116 to determine the amount of fluid flow through makeup water inlet line 111. Flow sensor interface module 212 may record the fluid flow data over time, which may be displayed to a user via GUI 206.

Pressure sensor interface module 214 may be executed by processor 202 for receiving and processing data measured by pressure sensor 118. For example, from the data received from pressure sensor 118, pressure sensor interface module 214 may determine the pressure differential across the closed loop hydronic boiler system. Pressure sensor interface module 214 may record the pressure data over time, which may be displayed to a user via GUI 206.

Water chemistry sensor interface module 216 may be executed by processor 202 for receiving and processing data measured by water chemistry sensor 120. For example, from the data received from water chemistry sensor 120, water chemistry sensor interface module 216 may determine the water chemistry composition of the water within the closed loop hydronic boiler system, e.g., the pH level, the composition of one or more minerals and/or chemicals such as a sodium nitrite blend, e.g., borate, silicate, tolyltriazole, and sodium hydroxide, the amount of corrosion inhibitors, the oxygen level, etc. Water chemistry sensor interface module 216 may record the water chemistry data over time, and may calculate, e.g., the rate of change of water chemistry over time, which may be displayed to a user via GUI 206.

Leak detection and prediction module 218 may be executed by processor 202 for determining a leak or potential leak of the closed loop hydronic boiler system based on at least one of the fluid flow data received by flow sensor interface module 212, the pressure data received from pressure sensor interface module 214, or the water chemistry data received from water chemistry sensor interface module 216. For example, leak detection and prediction module 218 may determine there is a leak if the fluid flow data indicates there is positive movement of water through makeup water inlet line 111, if the pressure data indicates that the pressure differential across the closed loop system has dropped below a predetermined threshold, if the water chemistry data indicates that the rate of change of the water chemistry over time exceeds a predetermined threshold, or any combination thereof. For example, leak detection and prediction module 218 may determine there is no leak if the pressure data indicates there is a pressure drop across the closed loop system, but the fluid flow data indicates there is no movement of water through makeup water inlet line 111. In some embodiments, when fluid flow sensor 116 is configured to measure an amount of fluid flow through makeup water inlet line 111, leak detection and prediction module 218 may determine a leak if the amount of fluid flow through makeup water inlet line 111 exceeds a predetermined threshold.

Moreover, leak detection and prediction module 218 may predict a leak based on the monitored data received by flow sensor interface module 212, pressure sensor interface module 214, and/or water chemistry sensor interface module 216. For example, leak detection and prediction module 218 may detect patterns within the pressure data and/or the water chemistry data which may be consistent with the onset of a leak, even before positive movement of water through makeup water inlet line 111 is detected by fluid flow sensor 116, and predict a leak by comparing the detected patterns with historical data stored in memory 208. Additionally, leak detection and prediction module 218 may generate maintenance suggestions and provide water use projections to assist the user with taking the appropriate course of action to address the potential leak.

Hydronic boiler interface module 220 may be executed by processor 202 for communicating with the controls of hydronic boiler 102. For example, when controller 200 is configured to perform one or more automated responses upon detection of a leak by leak detection and prediction module 218, hydronic boiler interface module 220 may communicate instructions to the controls of hydronic boiler 102 to thereby adjust one or more operations of hydronic boiler 102, e.g., temperature, efficiency, run time, etc. As described above, the closed loop hydronic boiler system may include more than one hydronic boiler, and thus, hydronic boiler interface module 220 may communicate with the controls of each hydronic boiler in the system.

Alert generation module 222 may be executed by processor 202 for generating an alert, e.g., an audible or visual alert, upon the detection and/or prediction of a leak by leak detection and prediction module 218. For example, GUI 206 may emit and/or display the alert to notify a user of the leak and/or potential leak. Alert generation module 222 further may cause GUI 206 to display maintenance suggestions and/or water use projections generated by leak detection and prediction module 218 to inform and guide a user regarding appropriate actions to address a leak or potential leak.

Cloud storage interface module 224 may be executed by processor 202 for transmitting and receiving data from cloud storage 122. For example, cloud storage interface module 224 may transmit fluid flow data, pressure data, and/or water chemistry data to cloud storage 122 for storage, which may be subsequently accessed and downloaded by controller 200 and/or a third party with permission to access cloud storage 200.

Figure 3:
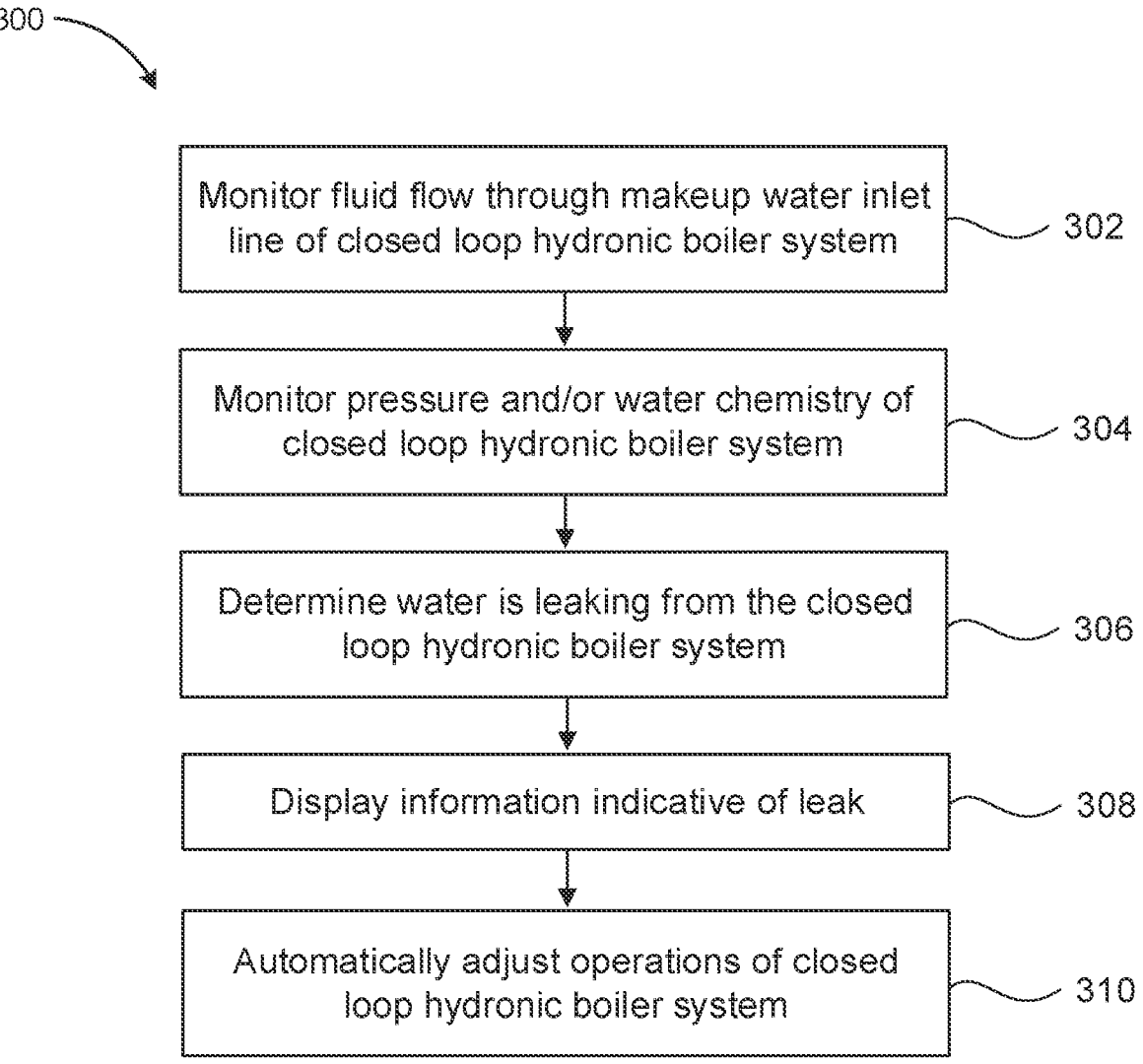
FIG. 3 is a flow chart illustrating method steps for monitoring makeup water in a closed loop hydronic boiler system for detecting a leak in accordance with the principles of the present disclosure.

Referring now to FIG. 3, method 300 for monitoring makeup water in a closed loop hydronic boiler system for detecting a leak is provided. At step 302, fluid flow through makeup water inlet line 111 is monitored, e.g., via fluid flow sensor 116. As described above, fluid flow sensor 116 may monitor whether or not there is fluid flow through makeup water inlet line 111, or alternatively, the amount of fluid flow through makeup water inlet line 111. Accordingly, at step 302, controller 200 may determine whether there is positive movement of makeup water through makeup water inlet line 111.

At step 304, additional parameters of the closed loop hydronic boiler system may be monitored. For example, as described above, the pressure differential across the closed loop system may be measured, e.g., via pressure sensor 118, and/or the water chemistry of the closed loop system may be measured, e.g., via water chemistry sensor 120. Accordingly, at step 302, controller 200 may determine the pressure differential across the closed loop system in real-time, and/or determine the water chemistry of water within the closed loop system including, for example, the rate of change of water chemistry of the closed loop system over time.

At step 306, controller 200 may determine water is leaking from the closed loop system based at least on data indicative of movement of water through makeup water inlet line 111. For example, positive movement of water through makeup water inlet line 111 alone may be indicative of a leak within the closed loop system. In some embodiments, controller 200 also may consider data indicative of the pressure differential across the closed loop system and/or data indicative of the water chemistry of the closed loop system in determining whether water is leaking from the closed loop system based. For example, information regarding pressure differential and/or water chemistry of the closed loop system may not be redundant, but may be used by controller 200 to determine or otherwise corroborate that water is in fact leaking from the closed loop system. For example, if controller 200 detects that there is a pressure drop across the closed loop system, but there is no movement of water through makeup water inlet line 111, then controller 200 may determine that there is not a leak. Similarly, if controller 200 detects that the rate of change of water chemistry over time exceeds a predetermined threshold, but there is no movement of water through makeup water inlet line 111, then controller 200 may determine that there is not a leak. Alternatively, as described above, controller 200 may predict a potential leak based on the monitored parameters of the closed loop system, e.g., if pressure across the system decreases by an amount exceeding a predetermined threshold over a predetermined time period, and/or the rate of change of water chemistry of the closed loop system exceeds a predetermined threshold.

At step 308, controller 200 may cause information indicative of the leak or a potential leak to be displayed, e.g., via GUI 206, in a manner readily observable by a user, such that the user may take appropriate maintenance actions. As described above, the information displayed to the user may be in the form of graphical representations of parameters of the closed loop system over time, and/or may include visual and/or audible alerts to draw the user's attention to the information displayed on GUI 206. The information further may include suggestive courses of action for the user to troubleshoot the closed loop system or otherwise proceed with necessary repair or replacement.

As described above, in some embodiments, controller 206 may take automated actions to at least temporarily address the detected leak. Accordingly, at step 310, controller 200 may automatically adjust one or more operations parameters of the closed loop system. For example, controller 200 may cause the hydronic boiler of the closed loop system to operate at lower temperatures to still provide water heating capabilities, while reducing the risk of scale buildup in the presence of a leak.

Modifications and variations of the methods and devices described herein will be obvious to those skilled in the art from the foregoing detailed description. Such modifications and variations are intended to come within the scope of the appended claims.

We claim:

1. An automated leak detection system for use with a closed loop hydronic boiler system having a makeup water inlet line, the system comprising:

a first sensor configured to obtain sensing data associated with fluid flow of the closed loop hydronic boiler system;

a second sensor in fluid communication with the hydronic boiler system and configured to obtain sensing data indicative of water chemistry of the hydronic boiler system;

at least one processor; and memory having instructions that, when executed by the at least one processor, cause the at least one processor to:

determine, based on the water chemistry, that water is leaking from the closed loop hydronic boiler system; and cause a display to display information indicative of the leak.

2. The system of claim 1, wherein the first sensor is fluidically coupled to the makeup water inlet line and configured to obtain sensing data indicative of fluid flow through the makeup water inlet line, and wherein the at least one processor is configured to:

determine movement of makeup water through the makeup water inlet line based on the sensed fluid flow; and determine that water is leaking from the closed loop hydronic boiler system based on the determined movement of makeup water through the makeup water inlet line.

3. The system of claim 2, wherein the fluid flow sensor comprises a Reed switch.

4. The system of claim 2, wherein the first sensor is a pressure sensor configured to obtain sensing data indicative of a pressure differential across the hydronic boiler system, and wherein the at least one processor is configured to determine a pressure drop based on the sensed pressure differential, and determine that water is leaking from the closed loop hydronic boiler system based on the determined pressure drop.

5. The system of claim 1, wherein the at least one processor is configured to cause the hydronic boiler system to operate at a lower temperature responsive to the determination that water is leaking from the closed loop hydronic boiler system to reduce a likelihood of scale buildup within the hydronic boiler system.

6. The system of claim 1, wherein the system is configured for use with a closed loop hydronic boiler system having two or more hydronic boilers, and wherein the at least one processor is configured to adjust operations of at least one of the two or more hydronic boilers responsive to the determination that water is leaking from the closed loop hydronic boiler system to limit damage to the system.

7. The system of claim 2, wherein the at least one processor is configured to record the determination of movement of makeup water through the makeup water inlet line over time.

8. The system of claim 2, wherein the at least one processor is configured to transmit information indicative of the determination of movement of makeup water through the makeup water inlet line to a cloud storage.

9. The system of claim 2, wherein the at least one processor is configured to generate an alert based on the determination of movement of makeup water through the makeup water inlet line.

10. The system of claim 9, wherein the at least one processor is configured to cause the display to display the alert.

11. The system of claim 1, wherein the first sensor is a pressure sensor configured to obtain sensing data indicative of a pressure differential across the hydronic boiler system, and wherein the at least one processor is configured to:

determine a pressure drop based on the sensed pressure differential; and determine that water is leaking from the closed loop hydronic boiler system based on the determined pressure drop.

12. The system of claim 11, wherein the at least one processor is configured to determine the pressure drop by comparing the sensed pressure differential with a baseline pressure differential under normal operation conditions.

13. The system of claim 12, wherein the at least one processor is configured to determine that water is leaking from the closed loop hydronic boiler system by determining when the determined pressure drop exceeds a predetermined threshold.

14. The system of claim 1, wherein the at least one processor is configured to determine that water is leaking from the closed loop hydronic boiler system by determining when a rate of change of the sensed water chemistry exceeds a predetermined threshold.

15. The system of claim 1, wherein the at least one processor is configured to determine that water is leaking from the closed loop hydronic boiler system by comparing the sensed water chemistry with a baseline water chemistry under normal operation conditions.

16. An automated leak detection system for use with a closed loop hydronic boiler system having a makeup water inlet line, the system comprising:

a fluid flow sensor fluidically coupled to the makeup water inlet line and configured to obtain sensing data indicative of fluid flow through the makeup water inlet line;

a second sensor in fluid communication with the hydronic boiler system;

at least one processor; and memory having instructions that, when executed by the at least one processor, causes the at least one processor to:

determine, using the second sensor, sensing data indicative of water chemistry of the hydronic boiler system; and determine that water is leaking from the closed loop hydronic boiler system based on the water chemistry.

17. The system of claim 16, wherein the at least one processor is configured to cause the hydronic boiler system to operate at a lower temperature responsive to the determination that water is leaking.

18. A method for automatically detecting a leak of a closed loop hydronic boiler system having a makeup water inlet line, the method comprising:

monitoring data associated with fluid flow of the closed loop hydronic boiler system;

monitoring data associated with water chemistry;

determining, by the at least one processor, that water is leaking from the closed loop hydronic boiler system based on the water chemistry; and displaying information indicative of the leak via a display.

19. The method of claim 18, wherein monitoring data associated with fluid flow of the closed loop hydronic boiler system comprises monitoring data indicative of fluid flow through the makeup water inlet line via a fluid flow sensor fluidically coupled to the makeup water inlet line, the method further comprising:

determining, by the at least one processor, movement of makeup water through the makeup water inlet line based on the monitored fluid flow, and determining, by the at least one processor, that water is leaking from the closed loop hydronic boiler system is based on the determined movement of makeup water through the makeup water inlet line.

* * * * *